United States Patent
Hao et al.

(10) Patent No.: US 12,473,463 B2
(45) Date of Patent: Nov. 18, 2025

(54) PROTECTIVE FILM, BATCH PREPARATION METHOD THEREFOR AND USE THEREOF

(71) Applicant: DALIAN INSTITUTE OF CHEMICAL PHYSICS, CHINESE ACADEMY OF SCIENCES, Liaoning (CN)

(72) Inventors: Jinkai Hao, Liaoning (CN); Hongjie Zhang, Liaoning (CN); Zhigang Shao, Liaoning (CN)

(73) Assignee: DALIAN INSTITUTE OF CHEMICAL PHYSICS, CHINESE ACADEMY OF SCIENCES, Liaoning (CN)

( * ) Notice: Subject to any disclaimer, the term of this patent is extended or adjusted under 35 U.S.C. 154(b) by 27 days.

(21) Appl. No.: 18/256,492

(22) PCT Filed: Sep. 22, 2021

(86) PCT No.: PCT/CN2021/119573
§ 371 (c)(1),
(2) Date: Jun. 8, 2023

(87) PCT Pub. No.: WO2022/127252
PCT Pub. Date: Jun. 23, 2022

(65) Prior Publication Data
US 2024/0101869 A1    Mar. 28, 2024

(30) Foreign Application Priority Data
Dec. 14, 2020 (CN) .......................... 202011476841.1

(51) Int. Cl.
*C09D 183/04* (2006.01)
*C09J 7/25* (2018.01)
(Continued)

(52) U.S. Cl.
CPC ................. *C09J 7/255* (2018.01); *C09J 7/38* (2018.01); *C09J 11/08* (2013.01); *C09J 183/06* (2013.01);
(Continued)

(58) Field of Classification Search
CPC .......... C09D 183/04; C08G 77/16; C09J 7/30; C09J 11/04; C09J 11/06; C09J 183/04
See application file for complete search history.

(56) References Cited

U.S. PATENT DOCUMENTS

| 4,902,141 A * | 2/1990 | Linnewiel .......... B65D 33/1691 383/89 |
| 2013/0241090 A1* | 9/2013 | Sakamoto ............ G02B 27/283 264/2.6 |

FOREIGN PATENT DOCUMENTS

| CN | 101932442 A | 12/2010 |
| CN | 105505245 A | 4/2016 |

(Continued)

OTHER PUBLICATIONS

CN109401655A English translation. (Year: 2019).*

*Primary Examiner* — Hai Y Zhang
(74) *Attorney, Agent, or Firm* — NKL Law; Allen Xue

(57) ABSTRACT

A protective film sequentially includes a release film, a low-viscosity silica gel layer, a high-viscosity silica gel layer and a substrate from top to bottom. A high-viscosity organosilicon adhesive, a hydroxyl-terminated polydimethylsiloxane, a curing agent, an additive and a solvent are coated on a polyester film. A low-viscosity organosilicon adhesive, the hydroxyl-terminated polydimethylsiloxane, the curing agent, the additive and the solvent are mixed and costed on the polyester film complex, which is pressed with the release film to obtain a silica gel protective film for fuel cells. A proton exchange membrane is coated with a catalyst to form a first catalyst layer, the protective film is adhered to the (Continued)

surface of the first catalyst layer, the second side of the proton exchange membrane is coated, and the silica gel protective film is peeled off after the coating is finished to obtain a CCM for a fuel cell.

8 Claims, 1 Drawing Sheet

(51) Int. Cl.
  *C09J 7/38* (2018.01)
  *C09J 11/08* (2006.01)
  *C09J 183/06* (2006.01)
  *H01M 4/88* (2006.01)

(52) U.S. Cl.
  CPC ......... *H01M 4/881* (2013.01); *H01M 4/8825* (2013.01); *C09J 2203/33* (2013.01); *C09J 2467/006* (2013.01); *C09J 2483/00* (2013.01)

(56) References Cited

FOREIGN PATENT DOCUMENTS

| | | | | | |
|---|---|---|---|---|---|
| CN | 107057592 | A | | 8/2017 | |
| CN | 109401655 | A | * | 10/2017 | ............ C08J 7/0427 |
| CN | 107312471 | A | | 11/2017 | |
| CN | 108753187 | A | | 11/2018 | |
| CN | 109016769 | A | | 12/2018 | |
| CN | 110105883 | A | | 8/2019 | |
| CN | 110117469 | A | | 8/2019 | |
| CN | 210458033 | U | | 5/2020 | |
| CN | 112592673 | A | | 4/2021 | |
| WO | 2020090797 | A1 | | 5/2020 | |

\* cited by examiner

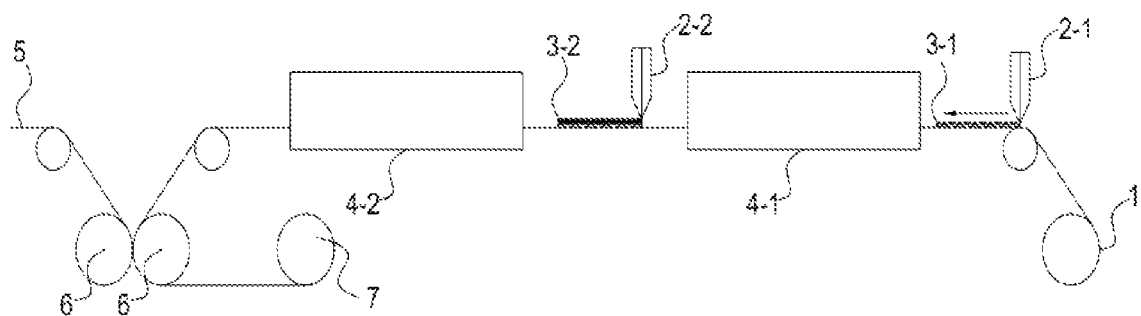

PROTECTIVE FILM, BATCH PREPARATION METHOD THEREFOR AND USE THEREOF

TECHNICAL FIELD

The present invention relates to the technical field of fuel cells, in particular to a novel protective film, a batch preparation method thereof and a use thereof in fuel cells.

BACKGROUND

Proton exchange membrane fuel cell (PEMFC) is an efficient and environmentally friendly power generation device, which uses clean energy as fuel and can directly and continuously convert the chemical energy of fuel into electricity. The power generation process of PEMFC does not involve combustion, and is therefore not limited by Carnot cycle, having high energy conversion rate. Theoretical thermal efficiency of PEMFC can reach 86%, which is far higher than that of a traditional heat engine (with a theoretical thermal efficiency of about 45%). At the same time, due to the advantages such as high efficiency, low pollution, short construction time, good reliability and maintenance, PEMFC is suitable for many applications involving transportation, power stations, mobile power vehicles and submarines, and has a broad market prospect.

At present, the preparation method of catalyst coated membrane (CCM) mainly includes spray coating method and transfer method. Spray coating method is low in efficiency, high in manufacturing cost and low in automation degree, and cannot meet the requirements of production expansion. For the transfer method, catalyst paste is first coated on the transfer substrate, and then transferred to the proton exchange membrane. Its process is complex and the transfer substrate is expensive, and further has problems such as incomplete transfer and low utilization rate of the membrane.

In order to realize continuous production of CCM, it is common in the current market to use a direct coating method to prepare CCM. This method is high in automation degree, high in efficiency and low in manufacturing cost, and can meet the requirements of production expansion. However, there is a problem of membrane swelling in the direct coating process, resulting in uneven surface and poor uniformity of the prepared CCM, and further affects the performance of CCM. When the coating method is used to prepare CCM, a protective film is used to protect the catalyst coating formed in the first coating during the second coating. However, protective film in the prior art is difficult to be directly removed after being heated, which must be removed after the adhesion reduction treatment, increasing the production process and cost.

SUMMARY OF THE INVENTION

It is an object of the present invention to provide a novel protective film and a batch preparation method thereof to solve the problems such as proton exchange membrane swelling caused by continuous coating in the preparation of CCM.

The present invention uses the following technical solutions:

The present invention provides a protective film, the upper layer thereof is a release film, the middle layer thereof is a viscous antistatic silica gel layer, and the lower layer thereof is a substrate. The viscous antistatic silica gel layer is of a double-layer structure with a high-viscosity silica gel layer as a lower layer and a low-viscosity silica gel layer as an upper layer. The adhesive force of the high-viscosity silica gel layer is 10-50 gf/25 mm, and the adhesive force of the low-viscosity silica gel layer is 0-10 gf/25 mm except for 0.

Further, the substrate is a polyester film, which is any one of polyethylene terephthalate film (PET) and polyethylene naphthalate film (PEN), with a thickness of 20-80 m.

Further, the release film is any one of PE release film, PET release film, PP release film, PC release film, PS release film, PMMA release film, BOPP release film, TPX release film, PVC release film and PTFE release film, with a thickness of 20-100 μm. The preferred viscosity of the release film is 0.1-5 gf/25 mm. The release film is suitable for protecting the clean of the low-viscosity silica gel layer.

The present invention also provides a method for preparing the protective film, including the following steps:

S1: Prepare a high-viscosity silica gel solution, coat the high-viscosity silica gel solution on the substrate, and obtain a composite substrate I after drying;

S2: Prepare a low-viscosity silica gel solution, coat the low-viscosity silica gel solution on the high-viscosity silica gel solution of the composite substrate I, and obtain a composite substrate II after drying;

S3: Heat-press the composite substrate II of S2 and the release film to attach them with each other under a pressure of 0.1-10 MPa, and obtain the protective film where the release film is applied on the low-viscosity silica gel solution of the composite substrate II.

Further, the low-viscosity silica gel solution includes 101-200 parts of low-viscosity organosilicon adhesive, 1-10 parts of hydroxy-terminated polydimethylsiloxane, 0.2-3 parts of curing agents, 0.1-1.5 parts of additives, and 50-70 parts of solvents. The high-viscosity silica gel solution includes 1-5 parts of high-viscosity organosilicon adhesive, 100-200 parts of hydroxy-terminated polydimethylsiloxane, 0.2-3 parts of curing agents, 0.1-1.5 parts of additives, and 50-70 parts of solvents. The adhesive force of the high-viscosity organosilicon adhesive is 10-50 gf/25 mm and the adhesive force of the low-viscosity organosilicon adhesive is 0-10 gf/25 mm.

Further, the curing agent is at least one of coupling agent KH-560, coupling agent KH-570 and coupling agent KH-602. The additive is a mixture of hydroxy propyl methyl cellulose (HPMC), dibenzoyl peroxide, Pt/C nano powder and nano oxide. The nano oxide is at least one of nano silicon dioxide, nano titanium dioxide and nano aluminium oxide. The solvent is preferably ethyl acetate.

Further, a mass ratio of hydroxypropyl methyl cellulose (HPMC), dibenzoyl peroxide, Pt/C nano powder to nano oxide is 1:0.1-0.5:0.1-0.5:0.1-1.5.

Further, when coat the high-viscosity silica gel solution, a coating speed is 1-4.9 m/min, a coating wet thickness is 50-80 m, and a drying temperature of the first drying oven is 60-180° C.; and when coat the low-viscosity silica gel solution, a coating speed is 1-4.9 m/min, a coating wet thickness is 20-60 m, and a drying temperature of the second drying oven is 60-180° C.

The method for preparing the protective film provided by the present invention adopts a continuous coating apparatus. The continuous coating apparatus includes a substrate transfer line and a release film transfer line for realizing transfer in opposite directions. Each of the substrate transfer line and the release film transfer line includes a plurality of rotating rollers for tensioning and winding the substrate or the release film. The substrate transfer line is sequentially provided with a coating die A for coating the high-viscosity silica gel layer, a first drying oven, a coating die B for coating the low-viscosity silica gel layer, and a second drying oven in a transfer direction.

An overlap between the substrate transfer line and the release film transfer line is provided with a heat-pressing attaching area, which is composed of two heat-pressing rollers rotating in opposite directions. The heat-pressing attaching area is disposed at a rear station of the second drying oven, and the substrate and the release film are heat-pressed by two heat-pressing rollers and then wound with the winding rollers.

The method for preparing a protective film using the above apparatus of the present invention includes the following steps:

S1: Prepare a high-viscosity silica gel solution, coat the high-viscosity silica gel solution on the substrate through the coating die A, and obtain a composite substrate I after drying in the first drying oven I;

S2: Prepare a low-viscosity silica gel solution, coat the low-viscosity silica gel solution on the high-viscosity silica gel solution of the composite substrate I through the coating die B, and obtain a composite substrate II after drying in the second drying oven II;

S3: heat-press the composite substrate II obtained in S2 and the release film to attach them with each other under a pressure of 0.1-10 MPa with the heat-pressing rollers, and then obtain the protective film and wind it with the winding roller. The release film is applied on the low-viscosity silica gel solution of the composite substrate II.

The present invention further provides an use of the said protective film, a catalyst paste is coated on a first side of the proton exchange membrane followed by drying to form a first catalyst layer, then the protective film is attached to a surface of the first catalyst layer followed by coating the catalyst paste on a second side of the proton exchange membrane, and then the protective film is peeled off after drying to obtain a CCM.

Compared with the prior art, the present invention has the following advantages:

1. The protective film for fuel cells prepared in the present invention has a multi-layer structure. Firstly, the substrate layer selects polyester film, which has good mechanical properties, good thermal stability, low price and wide sources, and meets the requirements of continuous production for fuel cells. Secondly, a high-viscosity silica gel layer is applied on the polyester film, so that the polyester film has a strongly adhesive surface. Finally, a low-viscosity silica gel layer is applied on the high-viscosity silica gel layer. On the one hand, the low-viscosity silica gel layer is firmly adhered to the polyester film through the high-viscosity silica gel layer, avoiding the silica gel layer falling on the proton exchange membrane during later peeling. On the other hand, the low-viscosity silica gel layer is adhered to the catalyst layer on the proton exchange membrane, which will not take away a large amount of catalyst and damage the integrity of the catalyst layer during peeling, and the low-viscosity silica gel layer does not require thermal or light irradiation to reduce adhesive force during peeping, having a simple process.

2. The present invention selects silicone adhesive to prepare high-viscosity silica gel layer and low-viscosity silica gel layer through different formulas, which will not remain on the surface of the catalyst layer during peeling. The present invention does not use polyurethane and poly-acrylic acids adhesives, mainly because peeling them will take the catalyst layer away even with assistance of thermal or light.

3. Additives and curing agents are added in the process of preparing the viscous silica gel layer. The addition of curing agents is to enable the viscous silica gel layer to solidify quickly and avoid uneven thickness of the viscous silica gel layer caused by strong fluidity of the mixed solution. The addition of additives promotes a more compact and uniform viscous silicone layer on one hand, ensuring an appropriate adhesive force of the mixed solution. On the other hand, the addition of nanoparticle compounds enables the surface of the viscous silica gel layer to have a plurality of microsphere protrusions, which form uneven contact points, so that enables the protective film to be in point connection with the proton exchange membrane during the preparation of CCM, greatly reducing the contact area and thus reducing the adhesive force, so that effectively avoids the technical problem that the protective film is difficult to peel off or takes away the catalyst applied on the proton exchange membrane when peeling off. In addition, the addition of additives utilizes reactive chemical groups to react with subsequent chemical substances to generate chemical covalent bond, improving the surface tension and the performance of acid and solvent resistance of the polyester film.

4. The protective film for fuel cells prepared by the present invention has a simple process for practical application. Proton exchange membrane coated with a catalyst layer on the first side and the protective membrane are pressed to attach together under a certain pressure, after the second side of the proton exchange membrane is coated, it does not need to use thermal radiation or ultraviolet light irradiation for the adhesion reduction treatment, but only directly peeling off is needed without taking away the catalyst and damaging the integrity of the catalyst layer.

5. The protective film for fuel cells prepared by the present invention is applied with a layer of release film on the uppermost low viscous silica gel layer after coating two layers of silica gel layer, ensuring the cleanliness of the viscous silica gel layer and effectively avoiding contamination of the protective film caused in the process of transfer and operation.

6. The protective film prepared by the present invention adopts a coating process for continuous production, which has advantages such as high production efficiency and good stability.

DETAILED DESCRIPTION OF DRAWINGS

In order to more clearly illustrate the technical solution in the embodiments of the present invention or in the prior art, the accompanying drawings required to be used in the description of the embodiments or the prior art are briefly introduced. Obviously, the accompanying drawings in the description below are some embodiments of the present invention. For those ordinary skilled in the art, other accompanying drawings can be obtained from these accompanying drawings without creative labor.

The figure shows a schematic diagram of a batch preparation process of the present invention In the figure, 1. polyester film, 2-1. coating die A, 2-2. coating die B, 3-1. complex I, 3-2. complex II, 4-1. first drying oven, 4-2. second drying oven, 5. release film, 6. heat-pressing roller, 7. winding roller.

DETAILED DESCRIPTION OF PREFERRED EMBODIMENTS

The present invention is further illustrated in detail in combination with the accompanying drawings.

The present invention provides a novel protective film, the lowermost layer of which is a substrate, the middle layer is a viscous antistatic silica gel layer, and the uppermost layer is a release film. The viscous antistatic silicone layer has two layers, the lower layer is a high-viscosity silica gel layer, and the upper layer is a low-viscosity silica gel layer.

The present invention further provides a batch preparation method of the novel protective film. The preparation method adopts a continuous coating apparatus, as shown in the figure. The continuous coating apparatus includes a substrate transfer line and a release film transfer line for realizing transfer in opposite directions. Each of the substrate transfer line and the release film transfer line includes a plurality of rotating rollers for tensioning and winding the substrate or the release film. An overlap between the substrate transfer line and the release film transfer line is provided with a heat-pressing attaching area which is composed of two heat-pressing rollers 6 rotating in opposite directions. The said continuous coating apparatus further includes a coating die A 2-1 for coating the high-viscosity silica gel layer, a first drying oven 4-1, a coating die B 2-2 for coating the low-viscosity silica gel layer and a second drying oven 4-2 sequentially arranged in a transfer direction of the substrate transfer line. The heat-pressing attaching area is arranged at a rear station of the second drying oven. The substrate and the release film are heat-pressed by two heat-pressing rollers and then wound by the winding rollers 7.

Embodiment 1

S1. 1 part of high-viscosity organosilicon adhesive with a adhesive force of 10 gf/25 mm, 100 parts of hydroxyl terminated polydimethylsiloxane, 0.2 parts of curing agent KH-560 and 50 parts of ethyl acetate were mixed and poured into a glass container, then 0.076 parts of hydroxypropyl methyl cellulose (HPMC), 0.008 parts of dibenzoyl peroxide, 0.008 parts of Pt/C nano powder and 0.008 parts of nano silicon dioxide were added into the above glass container. The mixture was magnetically stirred at 0° C. to fully mix until uniform, and bubbles were removed from the mixture through vacuum to obtain a high-viscosity silica gel solution;

S2. 101 parts of low-viscosity organosilicon adhesive with a adhesive force of 0.2 gf/25 mm, 1 part of hydroxyl terminated polydimethylsiloxane, 0.2 parts of curing agent KH-560 and 50 parts of ethyl acetate were mixed and poured into a glass container, then 0.076 parts of hydroxypropyl methyl cellulose (HPMC), 0.008 parts of dibenzoyl peroxide, 0.008 parts of Pt/C nano powder and 0.008 parts of nano silicon dioxide were added into the above glass container. The mixture was magnetically stirred at 0° C. to fully mix until uniform, and bubbles were removed from the mixture through vacuum to obtain a low-viscosity silica gel solution;

S3. The high-viscosity silica gel solution prepared in step S1 was filled into a storage tank of the coating die A 2-1 of the continuous coating apparatus, and the high-viscosity silica gel solution was evenly coated on a PET polyester film I by a coating process with thickness of 50 m and coating speed of 1 m/min, followed by dying in the first drying oven 4-1 at 60° C., and a PET complex I 3-1 with a high-viscosity silica gel solution was obtained. The obtained PET complex I 3-1 was composed of a high-viscosity silica gel layer and a PET polyester film I, and the adhesive force of the high-viscosity silica gel layer was 9.5 gf/25 mm;

S4. The low-viscosity silica gel solution prepared in step S2 was filled into a storage tank of the coating die B 2-2 of the continuous coating apparatus, and the low-viscosity silica gel solution was evenly coated on the PET complex I 3-1 obtained in step S3 by a coating process with thickness of 20 μm and coating speed of 1 m/min, followed by dying in the second drying oven 4-2 at 60° C., and a PET complex II 3-2 was obtained. The obtained PET complex II 3-2 was composed of the PET complex I 3-1 and a low-viscosity silica gel layer, and the adhesive force of the low-viscosity silica gel layer was 0.1 gf/25 mm;

S5. The PET complex II 3-2 obtained in step S4 and a PET release film 5 were pressed together through the heat-pressing rollers 6 under a pressure of 0.1 MPa. The PET release film 5 was covered on the viscous silica gel layer to protect the low-viscosity silica gel solution. After being wound by the winding roller 7, a silica gel protective film for fuel cells with a release film was obtained.

Embodiment 2

S1. 5 parts of high-viscosity organosilicon adhesive with a adhesive force of 30 gf/25 mm, 200 parts of hydroxyl terminated polydimethylsiloxane, 3 parts of curing agent KH-560 and 70 parts of ethyl acetate were mixed and poured into a glass container, then 0.6 parts of hydroxypropyl methyl cellulose (HPMC), 0.3 parts of dibenzoyl peroxide, 0.3 parts of Pt/C nano powder and 0.3 parts of titanium dioxide were added into the above glass container. The mixture was magnetically stirred at 5° C. to fully mix until uniform, and bubbles were removed from the mixture through vacuum to obtain a high-viscosity silica gel solution;

S2. 200 parts of low-viscosity organosilicon adhesive with a adhesive force of 5 gf/25 mm, 10 parts of hydroxyl terminated polydimethylsiloxane, 0.3 parts of curing agent KH-560 and 70 parts of ethyl acetate were mixed and poured into a glass container, then 0.6 parts of hydroxypropyl methyl cellulose (HPMC), 0.3 parts of dibenzoyl peroxide, 0.3 parts of Pt/C nano powder and 0.3 parts of titanium dioxide were added into the above glass container. The mixture was magnetically stirred at 5° C. to fully mix until uniform, and bubbles were removed from the mixture through vacuum to obtain a low-viscosity silica gel solution;

S3. The high-viscosity silica gel solution prepared in step S1 was filled into a storage tank of the coating die A 2-1 of the continuous coating apparatus, and the high-viscosity silica gel solution was evenly coated on a PEN polyester film I by a coating process with thickness of 80 m and coating speed of 4.9 m/min, followed by dying in the first drying oven 4-1 at 180° C., and a PEN complex I 3-1 with a high-viscosity silica gel solution was obtained. The obtained PEN complex I 3-1 was composed of a high-viscosity silica gel layer and a PEN polyester film I, and the adhesive force of the high-viscosity silica gel layer was 29 gf/25 mm.

S4. The low-viscosity silica gel solution prepared in step S2 was filled into a storage tank of the coating die B 2-2 of the continuous coating apparatus, and the low-viscosity silica gel solution was evenly coated on the PEN complex I 3-1 obtained in step S3 by coating process with thickness of 60 μm and coating speed of 4.9 m/min, followed by dying in the second drying oven 4-2 at 180° C., and a PEN complex II 3-2 was obtained. The PEN complex II 3-2 was composed of the PEN polyester film I 3-1 and a low-viscosity silica gel layer, and the adhesive force of the low-viscosity silica gel layer was 4.8 gf/25 mm;

S5. The PEN complex II 3-2 obtained in step S4 and a PP release film 5 were pressed together through the heat-pressing rollers 6 under a pressure of 10 MPa. The PP release film 5 was covered on the viscous silica gel layer to protect the low-viscosity silica gel solution. After being wound by the winding roller 7, a silica gel protective film for fuel cells with a release film was obtained.

Embodiment 3

S1. 3 parts of high-viscosity organosilicon adhesive with a adhesive force of 50 gf/25 mm, 150 parts of hydroxyl terminated polydimethylsiloxane, 1 part of curing agent KH-560 and 60 parts of ethyl acetate were mixed and poured into a glass container, then 0.76 parts of hydroxypropyl methyl cellulose (HPMC), 0.08 parts of dibenzoyl peroxide, 0.08 parts of Pt/C nano powder and 0.08 parts of nano aluminium oxide were added into the above glass container. The mixture was magnetically stirred at 2° C. to fully mix until uniform, and bubbles were removed from the mixture through vacuum to obtain a high-viscosity silica gel solution;

S2. 150 parts of low-viscosity organosilicon adhesive with a adhesive force of 2 gf/25 mm, 5 parts of hydroxyl terminated polydimethylsiloxane, 1 part of curing agent KH-560 and 60 parts of ethyl acetate were mixed and poured into a glass container, then 0.76 parts of hydroxypropyl methyl cellulose (HPMC), 0.08 parts of dibenzoyl peroxide, 0.08 parts of Pt/C nano powder and 0.08 parts of nano titanium dioxide were added into the above glass container. The mixture was magnetically stirred at 2° C. to fully mix until uniform, and bubbles were removed from the mixture through vacuum to obtain a low-viscosity silica gel solution;

S3. The high-viscosity silica gel solution prepared in step S1 was filled into a storage tank of the coating die A 2-1 of the continuous coating apparatus, and the high-viscosity silica gel solution was evenly coated on a PET polyester film I by a coating process with thickness of 60 m and coating speed of 2 m/min, followed by dying in the first drying oven 4-1 at 100° C., and a PET complex I 3-1 with a high-viscosity silica gel solution was obtained. The obtained PET complex I 3-1 was composed of a high-viscosity silica gel layer and a PET polyester film I, and the adhesive force of the high-viscosity silica gel layer was 48.8 gf/25 mm.

S4. The low-viscosity silica gel solution prepared in step S2 was filled into a storage tank of the coating die B 2-2 of the continuous coating apparatus, and the low-viscosity silica gel solution was evenly coated on the PET complex I 3-1 obtained in step S3 by a coating process with thickness of 40 μm and coating speed of 2 m/min, followed by dying in the second drying oven 4-2 at 100° C., and a PET complex II 3-2 was obtained. The obtained PET complex II 3-2 was composed of the PET complex I 3-1 and a low-viscosity silica gel layer, and the adhesive force of the low-viscosity silica gel layer was 1.8 gf/25 mm;

S5. The PET complex II 3-2 obtained in step S4 and a PP release film 5 were pressed together through the heat-pressing rollers 6 under a pressure of 5 MPa. The PP release film 5 was covered on the viscous silica gel layer to protect the low-viscosity silica gel solution. After being wound by the winding roller 7, a silica gel protective film for fuel cells with a release film was obtained.

Comparative Example 1

S1. 1 part of high-viscosity organosilicon adhesive with a adhesive force of 25 gf/25 mm, 100 parts of hydroxyl terminated polydimethylsiloxane, 0.2 parts of curing agent KH-560 and 50 parts of ethyl acetate were mixed and poured into a glass container, then 0.76 parts of hydroxypropyl methyl cellulose (HPMC), 0.08 parts of dibenzoyl peroxide, 0.08 parts of Pt/C nano powder and 0.08 parts of nano silicon dioxide were added into the above glass container. The mixture was magnetically stirred at 0° C. to fully mix until uniform, and bubbles were removed from the mixture through vacuum;

S2. The mixture prepared in step S1 was filled into a storage tank of the coating die A of the continuous coating apparatus and evenly coated on a PET polyester film by a coating process with thickness of 50 μm and coating speed of 1 m/min, followed by dying in the first drying oven at 60° C., a PET complex I 3-1 with a high-viscosity silica gel solution was obtained and the adhesive force thereof was 24.5 gf/25 mm;

S5. The PET complex I obtained in step S2 and a PET release film were pressed together through the heat-pressing rollers under a pressure of 0.1 MPa. The PET release e film was covered on the viscous silica gel layer. After being wound by the winding roller, a silica gel protective film for fuel cells with a release film was obtained.

Comparative Example 2

S1. 200 parts of low-viscosity organosilicon adhesive with a adhesive force of 5 gf/25 mm, 10 parts of hydroxyl terminated polydimethylsiloxane, 0.3 parts of curing agent KH-560 and 70 parts of ethyl acetate were mixed and poured into a glass container, then 0.6 parts of hydroxypropyl methyl cellulose (HPMC), 0.3 parts of dibenzoyl peroxide, 0.3 parts of Pt/C nano powder and 0.3 parts of nano titanium dioxide were added into the above glass container. The mixture was magnetically stirred at 5° C. to fully mix until uniform, and bubbles were removed from the mixture through vacuum for standby;

S2. The mixture prepared in step S1 was filled into a storage tank of the coating die A 2-1 of the continuous coating apparatus and evenly coated on a PEN polyester film by a coating process with thickness of 60 μm and coating speed of 4.9 m/min, followed by dying in the section drying oven at 180° C., a PEN complex I 3-1 was obtained, and the adhesive force of the low-viscosity silica gel layer was 4.9 gf/25 mm;

S3. The PEN complex I obtained in step S2 and a PP release film were pressed together through the heat-pressing rollers under a pressure of 10 MPa. The PP release film was covered on the viscous silica gel layer. After being wound by the winding roller, a silica gel protective film for fuel cells with a release film was obtained.

Comparative Example 3

S1. 100 parts of acrylic glue with a adhesive force of 5 gf/25 mm, 0.3 parts of the curing agent KH-560 and 70 parts of ethyl acetate were mixed and poured into a glass container. And then 0.6 parts of hydroxypropyl methyl cellulose (HPMC), 0.3 parts of dibenzoyl peroxide, 0.3 parts of Pt/C nano powder and 0.3 parts of nano titanium dioxide were added into the above glass container. The mixture was magnetically stirred at 5° C. to fully mix until uniform, and bubbles were removed from the mixture through vacuum for standby.

S2. The mixture prepared in step S1 was filled into a storage tank of the coating die A of the continuous coating apparatus and evenly coated on a PET polyester film by a coating process with thickness of 60 μm and coating speed of 4.9 m/min, followed by dying in the second drying oven at 180° C., a PEN complex I was obtained and the adhesive force of the viscous layer was 4.9 gf/25 mm.

S3. The PET film having an acrylic glue layer obtained in step S2 and a PP release film were pressed together through the heat-pressing rollers under a pressure of 10 MPa. The PP release film was covered on the acrylic glue layer. After being wound by the winding roller, an acrylic protective film for fuel cells with a release film was obtained.

Comparative Example 4

S1. 1 part of polyacrylate with a adhesive force of 10 gf/25 mm, 100 parts of hydroxyl terminated polydimethylsiloxane, 0.2 parts of curing agent KH-560 and 50 parts of ethyl acetate were mixed and poured into a glass container, then 0.076 parts of hydroxypropyl methyl cellulose (HPMC), 0.008 parts of dibenzoyl peroxide, 0.008 parts of Pt/C nano powder and 0.008 parts of nano silicon dioxide were added into the above glass container. The mixture was magnetically stirred at 0° C. to fully mix until uniform, and bubbles were removed from the mixture through vacuum to obtain a high-viscosity silica gel solution;

S2. 101 parts of polyvinyl alcohol with a adhesive force of 0.1 gf/25 mm, 1 part of hydroxyl terminated polydimethylsiloxane, 0.2 parts of curing agent KH-560 and 50 parts of ethyl acetate were mixed and poured into a glass container, then 0.076 parts of hydroxypropyl methyl cellulose (HPMC), 0.008 parts of dibenzoyl peroxide, 0.008 parts of Pt/C nano powder and 0.008 parts of nano silicon dioxide were added into the above glass container. The mixture was magnetically stirred at 0° C. to fully mix until uniform, and bubbles were removed from the mixture through vacuum to obtain a low-viscosity silica gel solution;

S3. The high-viscosity silica gel solution prepared in step S1 was filled into a storage tank of the coating die A 2-1 of the continuous coating apparatus and evenly coated on a PET polyester film I by a coating process with thickness of 100 μm and coating speed of 8 m/min, followed by dying in the first drying oven 4-1 at 200° C., a PET complex I 3-1 with high-viscosity silica gel layer was obtained, and the adhesive force of the high-viscosity silica gel layer was 9.5 gf/25 mm;

S4. The low-viscosity silica gel solution prepared in step S2 was filled into a storage tank of the coating die B 2-2 of the continuous coating apparatus and evenly coated on a PET complex I 3-1 by a coating process with thickness of 80 μm and coating speed of 5 m/min, followed by dying in the second drying oven 4-2 at 60° C., a PET complex II 3-2 was obtained, and the adhesive force of the low-viscosity silica gel layer was 0.09 gf/25 mm;

S5. The PET complex II 3-2 obtained in step S4 and a PET release film 5 were pressed together through the heat-pressing rollers 6 under a pressure of 5 MPa. The PET release film 5 was covered on the viscous silica gel layer to protect the low-viscosity silica gel solution. After being wound by the winding roller 7, a silica gel protective film for fuel cells with a release film was obtained.

Test Example

Apply the silica gel protective films prepared in the above embodiments and comparative examples to the catalyst layer coated on the proton exchange membrane, and detect it by peeling off the silica gel protective film: respectively weigh the weight of the silica gel protective films with the same size of 20*40 cm; press the CCM, with the same size of the silica gel protective film, with the silica gel protective films respectively and remove bubbles therein, and then peel off the protective film and test the peel strength, and weigh the weight of the silica gel protective film and calculate the adhesion rate by means of mass difference. The results are shown in the table below.

|  | Embodiment 1 | Embodiment 2 | Embodiment 3 | Comparative example 1 | Comparative example 2 | Comparative example3 | Comparative example4 |
|---|---|---|---|---|---|---|---|
| Peel strength N/mm | 0.03 | 0.03 | 0.02 | 5.4 | 0.05 | 0.7 | 4.6 |
| Adhesion rate/% | 1 | 0.8 | 0.89 | 30 | 25 | 60 | 55 |

By comparison, it was found that the fuel cell protective film with a multi-layer viscous silica gel layer prepared by the present invention was easy to peel off and did not require the adhesion reduction treatment process. However, in Comparative example 1, there was no low-viscosity silica gel layer, and a large amount of catalyst was taken away during peeling and the peel strength was relatively high. In Comparative example 2, there was no high-viscosity silica gel layer for attaching, and a part of the silica gel layer was adhered onto the surface of the catalyst layer during peeping. In Comparative example 3, since the acrylic glue layer used has strong adhesion to the catalyst layer, a large amount of catalyst layer was taken away during peeping, which affects the electrochemical performance of the fuel cell. In Comparative example 4, the compositions of the high-viscosity silica gel layer and the low-viscosity silica gel layer were changed by using polyacrylate and polyvinyl alcohol respectively, and according to the test, the adhesive force did not decrease even after the adhesion reduction treatment.

Finally, it should be noted that the above various embodiments are only used to illustrate the technical solutions of the present invention without limitation; and despite reference to the aforementioned embodiments to make a detailed description of the present invention, those of ordinary skilled in the art should understand: the described technical solutions in above various embodiments may be modified or the part of or all technical features may be equivalently substituted; while these modifications or substitutions do not make the essence of their corresponding technical solutions deviate from the scope of the technical solutions of the embodiments of the present invention.

The invention claimed is:

1. A protective film comprising a release film, a substrate, and a viscous antistatic silica gel layer disposed between the release film and the substrate, wherein the viscous antistatic silica gel layer has a first silica gel layer attached to the substrate and a second silica gel layer attached to the release film, wherein an adhesive force of the first silica gel layer is x and 10≤x≤50 gf/25 mm, and an adhesive force of the second silica gel layer is y and 0<y≤10 gf/25 mm.

2. The protective film according to claim 1, wherein the substrate is a polyethylene terephthalate (PET) film or a polyethylene naphthalate (PEN) film, and has a thickness of 20-80 μm.

3. The protective film according to claim 1, wherein the release film is selected from a polyethylene (PE) release film, a polyethylene terephthalate (PET) release film, a polypropylene (PP) release film, a polycarbonate (PC) release film, a biaxially oriented polypropylene (BOPP) release film, a polyvinyl chloride (PVC) release film, and a polytetrafluoroethylene (PTFE) release film, with a thickness of 20-100 μm.

4. A method for preparing the protective film of claim 1, comprising following steps of:
S1: coating a first silica gel solution on the substrate, and obtaining a first composite substrate comprising the first silica gel layer after drying;
S2: coating a second silica gel solution on a surface of the first silica gel layer of the composite substrate, and obtaining a second composite substrate after drying, wherein the second composite substrate comprises the second silica gel layer disposed on the surface of the first silica gel layer; and
S3: heat-pressing the second composite substrate and the release film together under a pressure of 0.1-10 MPa to obtain the protective film, wherein the release film is applied on a surface of the second silica gel layer of the second composite substrate.

5. The method according to claim 4, wherein the second silica gel solution comprises 101-200 parts of a second organosilicon adhesive, 1-10 parts of hydroxy-terminated polydimethylsiloxane, 0.2-3 parts of a curing agent, 0.1-1.5 parts of an additive, and 50-70 parts of a solvent, and the first silica gel solution comprises 1-5 parts of a first organosilicon adhesive, 100-200 parts of hydroxy-terminated polydimethylsiloxane, 0.2-3 parts of the curing agent, 0.1-1.5 parts of the additive, and 50-70 parts of the solvent, wherein an adhesive force of the first organosilicon adhesive is 10-50 gf/25 mm and an adhesive force of the second organosilicon adhesive is 0-10 gf/25 mm.

6. The method according to claim 5, wherein the curing agent is selected from coupling agent KH-560, coupling agent KH-570, coupling agent KH-602, and mixtures thereof; the additive is a mixture comprising hydroxypropyl methyl cellulose (HPMC), dibenzoyl peroxide, a Pt/C nano powder, and a nano oxide, wherein the nano oxide is selected from nano silicon dioxide, nano titanium dioxide, nano aluminium oxide, and mixtures thereof; and the solvent is ethyl acetate.

7. The method according to claim 6, wherein a mass ratio of hydroxypropyl methyl cellulose (HPMC), dibenzoyl peroxide, the Pt/C nano powder to the nano oxide is 1:0.1-0.5:0.1-0.5:0.1-1.5.

8. The method according to claim 4, wherein the first silica gel solution is coated at a speed of 1-4.9 m/min for a coating wet thickness of 50-80 μm, and dried at a drying temperature of 60-180° C.; and the second silica gel solution is coated at a speed of 1-4.9 m/min for a coating wet thickness of 20-60 μm, and dried at a drying temperature of 60-180° C.

* * * * *